(12) United States Patent
Ohta et al.

(10) Patent No.: US 8,031,371 B2
(45) Date of Patent: Oct. 4, 2011

(54) IMAGE PROCESSING APPARATUS AND METHOD CONTROLLING THE AMOUNT OF TRANSPARENT INK FOR RECORDING

(75) Inventors: Ken-ichi Ohta, Kawasaki (JP); Ritsuko Otake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/970,038

(22) Filed: Dec. 16, 2010

(65) Prior Publication Data

US 2011/0090521 A1 Apr. 21, 2011

Related U.S. Application Data

(62) Division of application No. 11/917,255, filed as application No. PCT/JP2006/312189 on Jun. 12, 2006.

(30) Foreign Application Priority Data

Jun. 30, 2005 (JP) .................................. 2005-192202

(51) Int. Cl.
 *H04N 1/40* (2006.01)
 *H04N 1/60* (2006.01)
(52) U.S. Cl. .......................................... 358/2.1; 358/1.9
(58) Field of Classification Search .................... 358/1.9, 358/2.1; 347/40, 21, 95, 102; 399/341, 45, 399/298, 237, 302, 27
See application file for complete search history.

(56) References Cited

U.S. PATENT DOCUMENTS

| 5,444,518 | A | 8/1995 | Hashiguchi et al. |
| 6,412,934 | B1 | 7/2002 | Moriyama et al. |
| 6,863,374 | B2 | 3/2005 | Yamazaki et al. |
| 6,867,884 | B1 | 3/2005 | Rozzi |
| 7,139,521 | B2 * | 11/2006 | Ng et al. ........................ 399/341 |
| 7,178,898 | B2 * | 2/2007 | Hoshino .......................... 347/40 |
| 7,533,982 | B2 | 5/2009 | Yoneyama |
| 2005/0024399 | A1 | 2/2005 | Fukuda et al. |

FOREIGN PATENT DOCUMENTS

| EP | 0491087 A1 | 6/1992 |
| EP | 0703087 A2 | 3/1996 |
| EP | 1354713 A2 | 10/2003 |
| JP | 64-044756 A | 2/1989 |
| JP | 6-222646 A | 8/1994 |
| JP | 10-55085 A | 2/1998 |
| JP | 2000-290571 A | 10/2000 |
| JP | 2005-007590 A | 1/2005 |

OTHER PUBLICATIONS

International Search Report dated Aug. 11, 2006, in counterpart International Application No. PCT/JP2006/312189.
Office Action dated Sep. 24, 2009, in counterpart Japanese Application No. 2005-192202.
Communication dated Mar. 17, 2010, in counterpart European Application No. 08 168 922.6-1522.

* cited by examiner

*Primary Examiner* — Charlotte M Baker
(74) *Attorney, Agent, or Firm* — Fitzpatrick, Cella, Harper & Scinto

(57) ABSTRACT

An image processing apparatus includes a calculation unit configured to calculate an amount of a first coloring material in an area including a plurality of pixels; a determination unit configured to determine an allowable amount of a second coloring material in the area on the basis of the amount of the first coloring material, calculated by the calculation unit, and a limit of the amount of the coloring material; and a control unit configured to control an amount of the second coloring material in the area so as not to exceed the allowable amount of the second coloring material.

12 Claims, 10 Drawing Sheets

| 501 | | | | |
|---|---|---|---|---|
| 100 | 110 | 120 | 125 | 130 |
| 90 | 105 | 110 | 110 | 105 |
| 85 | 80 | 76 | 82 | 95 |
| 79 | 80 | 84 | 92 | 100 |
| 84 | 98 | 103 | 95 | 92 |

C (8 BITS)

| 502 | | | | |
|---|---|---|---|---|
| 100 | 90 | 60 | 45 | 30 |
| 130 | 105 | 90 | 90 | 105 |
| 140 | 122 | 103 | 112 | 121 |
| 155 | 132 | 121 | 105 | 109 |
| 168 | 144 | 111 | 122 | 120 |

M (8 BITS)

| 503 | | | | |
|---|---|---|---|---|
| 150 | 145 | 120 | 107 | 95 |
| 175 | 157 | 145 | 145 | 157 |
| 182 | 162 | 141 | 153 | 168 |
| 194 | 172 | 163 | 151 | 159 |
| 210 | 193 | 162 | 169 | 166 |

Y (8 BITS)

| 504 | | | | |
|---|---|---|---|---|
| 150 | 145 | 120 | 107 | 95 |
| 175 | 157 | 145 | 145 | 157 |
| 182 | 162 | 141 | 153 | 168 |
| 194 | 172 | 163 | 151 | 159 |
| 210 | 193 | 162 | 169 | 166 |

K (8 BITS)

| 505 | | | | |
|---|---|---|---|---|
| 196 | 192 | 165 | 151 | 137 |
| 224 | 205 | 192 | 192 | 205 |
| 231 | 206 | 181 | 196 | 216 |
| 244 | 218 | 208 | 196 | 207 |
| 264 | 246 | 211 | 218 | 213 |

TOTAL AMOUNT OF TONER (%)

AVERAGE VALUE
IN WINDOW
= 204.6 %

36%

Mode Setup

☒ Priority is given to effect ~901

☐ Priority is given to speed ~902

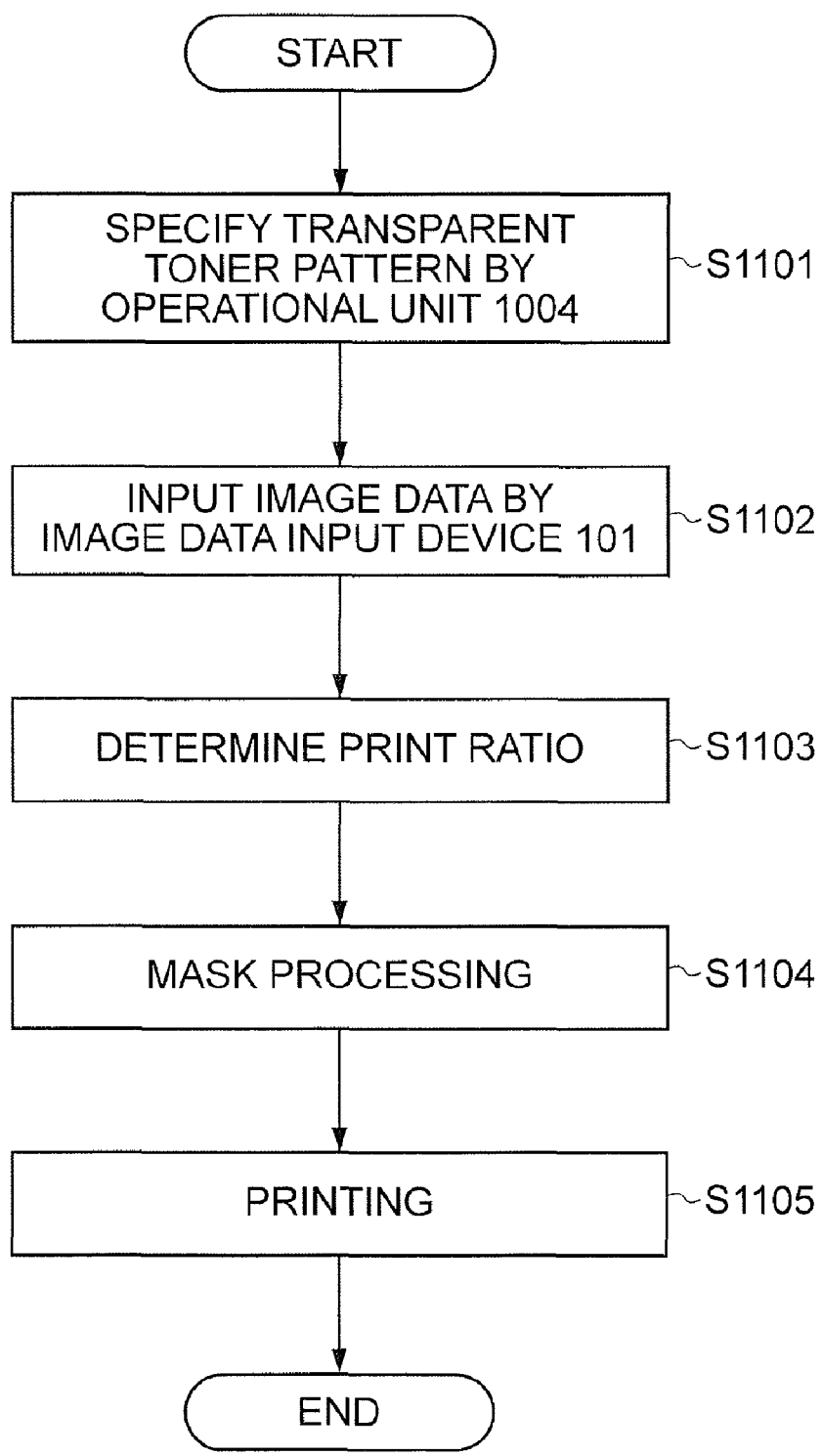

IMAGE PROCESSING APPARATUS AND METHOD CONTROLLING THE AMOUNT OF TRANSPARENT INK FOR RECORDING

This application is a divisional of U.S. patent application Ser. No. 11/917,255, filed Dec. 12, 2007, which is a 371 of International Application No. PCT/JP2006/312189, filed Jun. 12, 2006.

TECHNICAL FIELD

The present invention relates to an image processing apparatus, an image processing method, and a computer program, which control the amount of a color material used for recording.

BACKGROUND ART

Digital printing technologies have been increasing the utility value in on-demand printing markets and printing markets requiring a small number of documents in recent years. In particular, full-color printing using an electrophotographic technology holds superiority in the productivity, printing cost, ease of maintenance, etc. over other printing technologies and has been rapidly expanding its market.

Both full-color printing using toner of four colors (cyan, magenta, yellow, and black (CMYK)) by the electrophotographic technology, and multicolor printing using special toner, are receiving attention and come within the range of special printing markets requiring a higher level of on-demand features and immediacy.

Multicolor printing using special toner is exemplified by a system of forming an image with transparent toner on a sheet of paper that is subjected to electrophotographic printing, and using the information in the image to prove that the document is an original. Although the printed information is not normally invisible, the printed information becomes visible by irradiating it with ultraviolet light, and it is possible to indicate that the print is not falsified or is not reproduced by copying.

As described above, using special toner can provide new added value different from the value of the normal digital printing to further expand the world of digital printing.

Although the transparent toner layer is superimposed on a black-and-white print in the above example, applying the transparent toner in color printing in the same manner as in the black-and-white printing achieves a similar effect. For example, Japanese Patent Laid-Open No. H10-055085 discloses a technology of using the transparent toner in the color printing to control the glossiness of a printed surface.

This type of multi-color printing using the transparent toner etc. differs from the four-color printing in that the total amount of toner used in the printing is greatly increased.

Particularly in the application of special toner to color printing using the electrophotographic technology, in addition to a toner image with the toner of the four colors C, M, Y, and K, a special toner image with the transparent toner or the like is formed on an intermediate transfer unit, and it is necessary to transfer, heat, and fix the special toner image on a sheet of paper. Since an increased total amount of toner is processed in each electrophotographic process, a heavier load is applied to each electrophotographic process.

In order to lighten the load on each electrophotographic process, after a series of processes including the development, transfer, and fixing of the toner of the four colors C, M, Y, and K has been performed, the same series of processes using the special toner, such as the transparent toner, may be performed on the same sheet of paper. However, with this structure, it is necessary to perform the same series of processes multiple times, and thus the productivity of the apparatus is reduced.

In an electrophotographic process using the four colors C, M, Y, and K, the color components of three CMY colors are substituted with the K (black) color component for every pixel in order to restrict the amount of toner. However, since the special toner cannot be replaced with another toner component, it is not possible to perform the same process when the special toner, such as the transparent toner, is added. In addition, although the amount of toner is conventionally controlled for every pixel, applying the same process to the printing of additional image information with the toner having a special function, such as the transparent toner, not only increases the amount of calculation but also makes the relative amount of the transparent toner for every pixel unstable to possibly decrease the stability of the additional information.

In the technology disclosed in Japanese Patent Laid-Open No. H10-055085, in order to keep the gloss of a print constant, different amounts of the transparent toner are used for different kinds of paper to control the glossiness for every pixel. However, the control of the amount of toner per unit area is not performed in this technology.

DISCLOSURE OF THE INVENTION

The present invention provides an image processing apparatus capable of controlling the amount of toner per unit area without reducing the productivity of the apparatus even when an image is printed with special toner.

According to an embodiment of the present invention, an image processing apparatus includes a calculation unit configured to calculate an amount of a first coloring material in an area including a plurality of pixels; a determination unit configured to determine an allowable amount of a second coloring material in the area on the basis of the amount of the first coloring material, calculated by the calculation unit, and a limit of the amount of the coloring material; and a control unit configured to control an amount of the second coloring material in the area so as not to exceed the allowable amount of the second coloring material.

According to another embodiment of the present invention, an image processing method includes the steps of calculating an amount of a first coloring material in an area including a plurality of pixels; determining an allowable amount of a second coloring material in the area on the basis of the calculated amount of the first coloring material and a limit of the amount of the coloring material; and controlling an amount of the second coloring material in the area so as not to exceed the allowable amount of the second coloring material.

According to yet another embodiment of the present invention, a computer-readable program includes program code including the steps of calculating an amount of a first coloring material in an area including a plurality of pixels; determining an allowable amount of a second coloring material in the area on the basis of the calculated amount of the first coloring material and a limit of the amount of the coloring material; and controlling an amount of the second coloring material in the area so as not to exceed the allowable amount of the second coloring material.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flowchart showing the entire process in the image processing apparatus according to the first exemplary embodiment of the present invention.

BEST MODES FOR CARRYING OUT THE INVENTION

Embodiments of the present invention will be described in detail with reference to the attached drawings.

First Exemplary Embodiment

Figure 10:
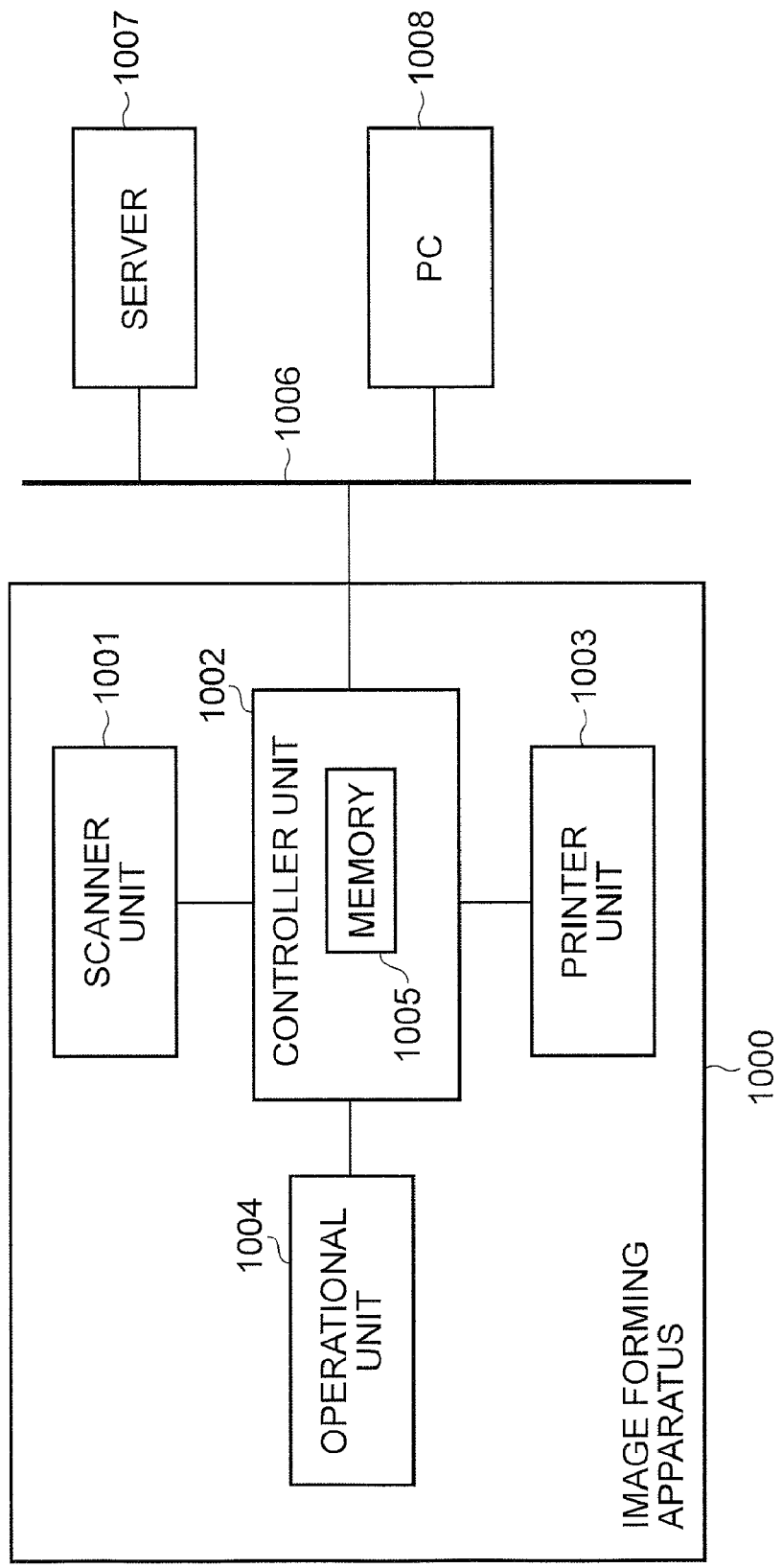
FIG. 10 is a block diagram schematically showing an example of the structure of an image forming apparatus according to the exemplary embodiments of the present invention.

FIG. 10 is a block diagram schematically showing an example of the structure of an image forming apparatus 1000 according to a first exemplary embodiment of the present invention. A common digital multifunction machine having copy, print, facsimile and other functions is used as the image forming apparatus 1000 in the first exemplary embodiment. Referring to FIG. 10, the image forming apparatus 1000 includes a scanner unit 1001 that scans the document and a controller unit 1002 that performs image processing for the image data scanned by the scanner unit 1001 and stores the processed image data in a memory 1005. The image forming apparatus 1000 also includes an operational unit 1004 that sets various print setup conditions for the image data scanned by the scanner unit 1001. The image forming apparatus 1000 further includes a printer unit 1003 that forms a visual image of the image data read out from the memory 1005 on a recording sheet of paper in accordance with the print setup conditions set in the operational unit 1004. The image forming apparatus 1000 is connected to a server 1007 managing the image data and to a personal computer (PC) 1008 instructing the image forming apparatus 1000 to perform printing over a network 1006, such as a local area network (LAN).

Figure 2:
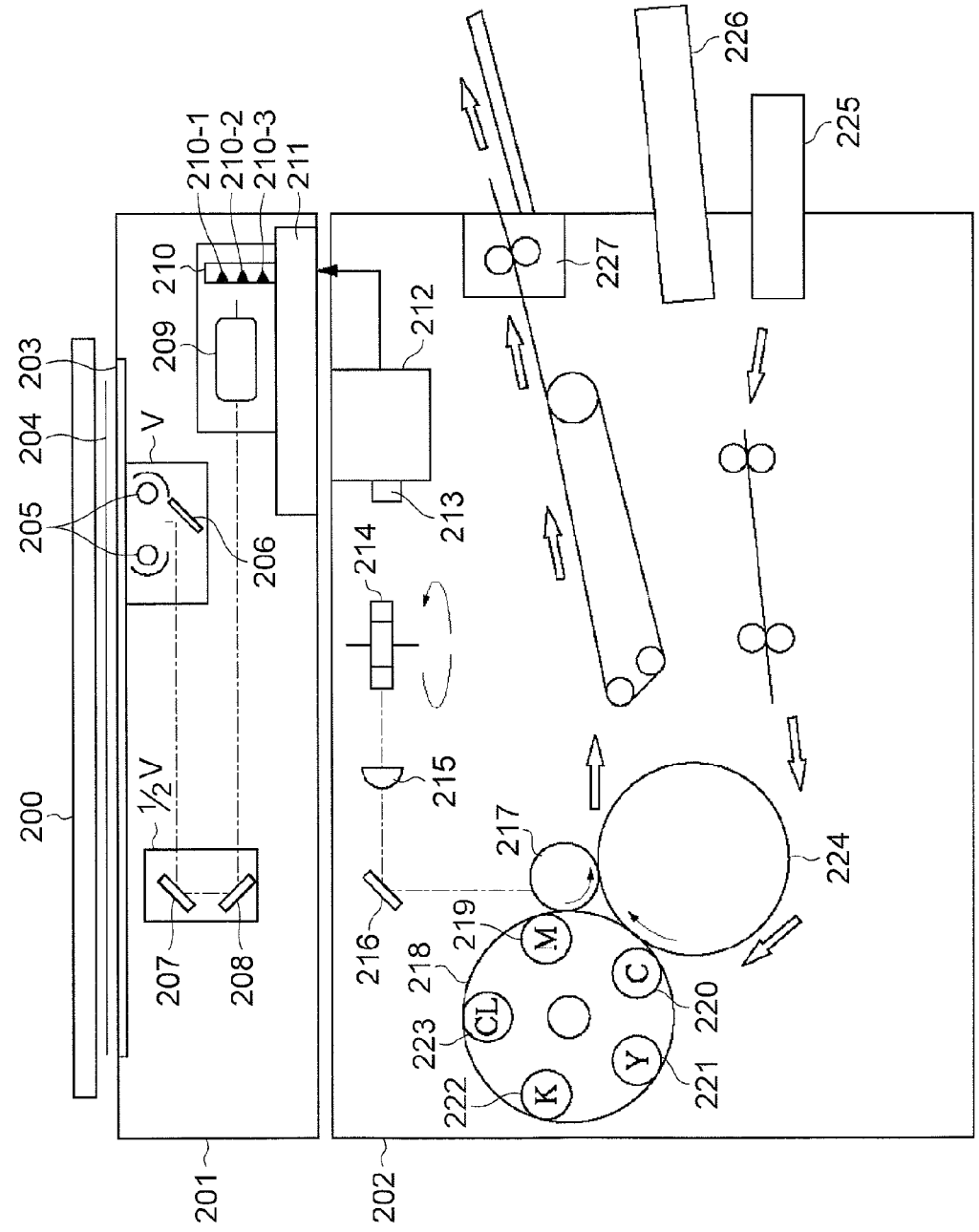
FIG. 2 is a cross-sectional view of a digital multifunction machine according to the exemplary embodiments of the present invention.

FIG. 2 is a cross-sectional view of the digital multifunction machine realizing the image forming apparatus 1000 according to the first exemplary embodiment of the present invention. The structure of the image forming apparatus 1000 according to the first exemplary embodiment will be described in detail with reference to FIG. 2. As described above, the image forming apparatus 1000 has the copy, print, facsimile, and other functions. As shown in FIG. 2, the image forming apparatus 1000 according to the first exemplary embodiment includes a scanner 201 and a printer 202 for printing and recording.

The scanner 201 scans a document and performs digital signal processing. The printer 202 prints an output image corresponding to the document image scanned by the scanner 201 on a sheet of paper in full color.

In the scanner 201, a pressure plate 200 presses down a document 204 on a document glass plate (hereinafter referred to as a platen) 203. The document 204 on the platen 203 is irradiated with light from lamps 205 to form an image on three solid-state image sensors (hereinafter referred to as charge coupled devices (CCDs)) 210-1, 210-2, and 210-3 through mirrors 206 to 208 and a lens 209. Three image signals of red (R), green (G), and blue (B) are supplied to a signal processor 211 as full-color information. The lamps 205 and the mirror 206 move at a velocity of v and the mirrors 207 and 208 move at a velocity of ½v in a direction perpendicular to the electrical scanning direction (primary scanning direction) of the CCDs 210-1 to 210-3 to scan the document 204 in a secondary scanning direction. The document 204 is scanned at a resolution of 600 dpi (dots per inch) both in the primary scanning direction and in the secondary scanning direction. The read image signals are stored in the memory 1005 in the signal processor 211 (corresponding to the controller unit 1002 in FIG. 10) in units of pages.

The controller unit 1002 electrically processes the image signal stored therein for every pixel to separate the image signal into components of magenta (M), cyan (C), yellow (Y), and black (K) and transmits the components to the printer 202. The controller unit 1002 includes a transparent-toner image generator 106, described below with reference to FIG. 1, which generates transparent image data (CL) for every pixel and supplies the generated transparent image data (CL) to the printer 202. The process in the controller unit 1002 will be described in detail below with reference to FIG. 1.

The image signals of M, C, Y, K, and CL, which are transmitted from the controller unit 1002, are supplied to a laser driver 212 in the printer 202. The laser driver 212 modulates and drives a semiconductor laser 213 in accordance with the transmitted image signals. The laser beam from the semiconductor laser 213 passes through a polygon mirror 214, an f-θ lens 215, and a mirror 216 to scan over a photosensitive drum 217. As in the scanning, the image is written at a resolution of 600 dpi (dots per inch) both in the primary scanning direction and in the secondary scanning direction.

A rotational developing unit 218 includes a magenta developing section 219, a cyan developing section 220, a yellow developing section 221, a black developing section 222, and a transparent developing section 223. The five developing sections alternately come into contact with the photosensitive drum 217 to develop an electrostatic image formed on the photosensitive drum 217 with the toner of each type.

A sheet of paper fed from a sheet cassette 225 or a sheet cassette 226 is wrapped around a transfer drum 224 to transfer the image developed on the photosensitive drum 217 to the sheet of paper.

After the toner of the five colors M, C, Y, K, and CL (transparent) are sequentially transferred in the manner described above, the sheet of paper passes through a fixing unit 227 and is ejected after the toner is fixed on the sheet of paper.

Image Processing Flow

Figure 1:
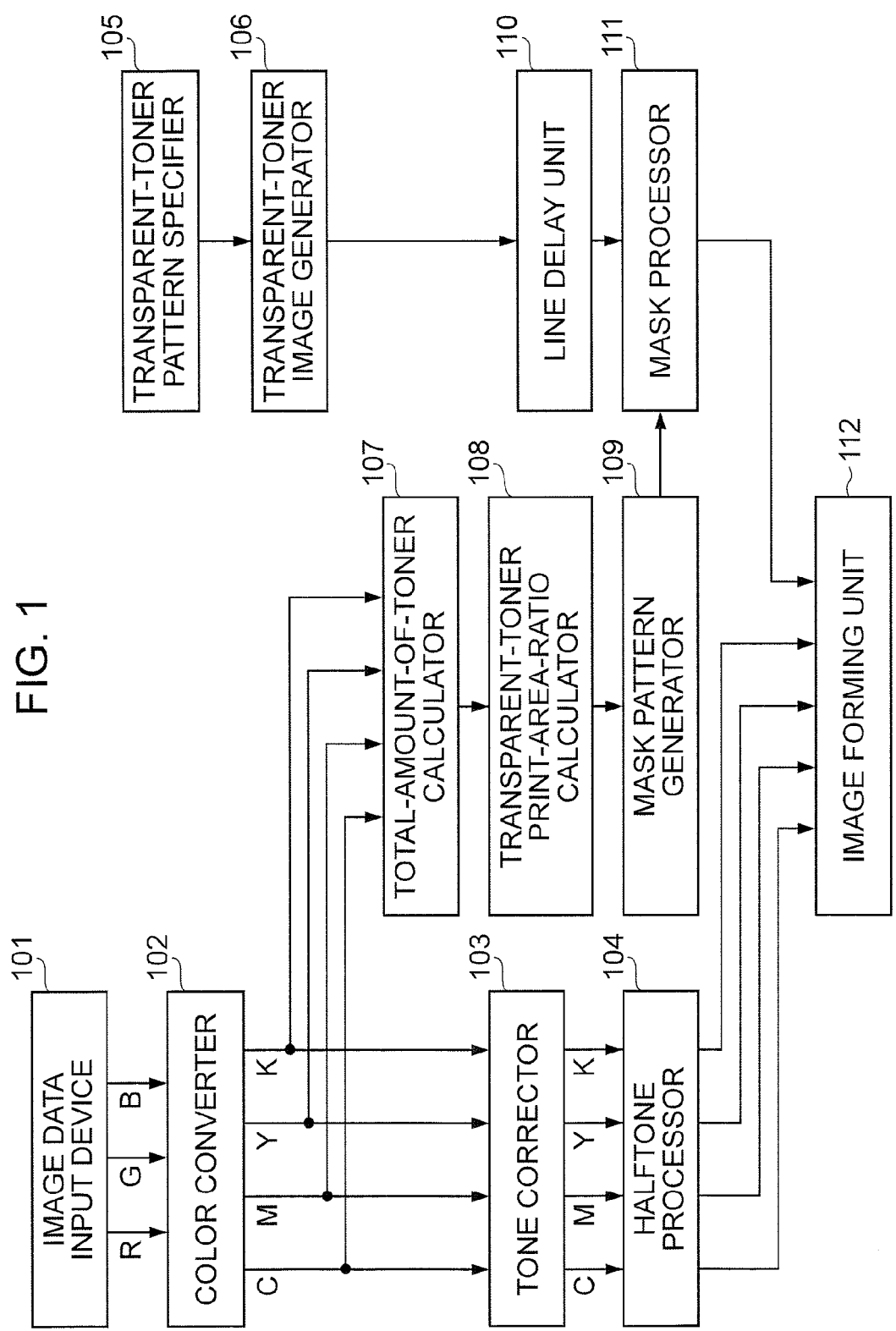
FIG. 1 is a block diagram illustrating image processing according to a first exemplary embodiment of the present invention.

FIG. 1 is a block diagram showing in detail an example of the structure of the controller unit 1002 performing the image processing in the image forming apparatus 1000 shown in FIG. 10. The image processing performed in the image forming apparatus 1000 will be described with reference to FIGS. 1 and 10.

The controller unit 1002 receives an image signal from the scanner unit 1001. Although the received image signal typically has three colors red (R), green (G), and blue (B) in 256-grayscale, the image signal is not limited to these colors in the 256-grayscale. An image data input device 101 receives the image in units of pixels, the image being scanned by the scanner 201 and being temporarily stored in the memory 1005 in units of pages. A color converter 102 converts the image signals of R, G, and B in the color space of the scanner 201 into the image signals of C, M, Y, and K in the color space for printout, for every pixel. The generated image signals of C, M, Y, and K are subjected to tone correction in a tone corrector 103 so that normal tone characteristics are yielded, and are subjected to pseudo halftone processing, such as a dither method, for image formation in a halftone processor 104.

A transparent-toner pattern specifier 105 is used for specifying an output pattern of transparent toner through the user interface of the operational unit 1004 in the image forming apparatus 1000 or through a keyboard, a mouse, a digital pen, or a pointing device (not shown) of the PC 1008. It is presumed here that the transparent toner is used to superimpose a pattern for assuring the original document on the image. For example, a character string, such as "secret" or "confidential", may be specified, the print date or information concerning a user may be selected from multiple choices, or a character string may be directly specified with a keyboard or the like.

The information specified by the transparent-toner pattern specifier 105 is supplied to the transparent-toner image generator 106. The transparent-toner image generator 106 generates an image pattern to be output with the transparent toner in accordance with the specified information in a bitmap format for every pixel.

A total-amount-of-toner calculator 107 calculates the total amount of toner of the four colors C, M, Y, and K, excluding the transparent toner component. The total amount of toner is calculated for every pixel on the basis of the total amount of signals of the four colors (C, M, Y, and K). The total amount of toner is ordinarily represented as a percentage with respect to the maximum value of monochrome, which corresponds to 100%. When the image signal is represented by an 8-bit integer, the maximum value of monochrome is "255", so that the sum of the amounts of the toner of the four colors C, M, Y, and K is multiplied by 100/255 to calculate the total amount of toner.

For example, if C=80, M=95, Y=140, and K=110 for a pixel in an 8-bit image signal, the total amount of toner is given by the following equation.

[Formula 1]

$$\text{Total amount of toner}=(C+M+Y+K)\times 100/255 \quad (1)$$

In this case, the total amount of toner results in 167%. The upper limit of the total amount of toner is normally 200% to 280%, and is determined in accordance with the structure of an imaging process or the like.

According to the first exemplary embodiment of the present invention, it is required that the sum of the amount of the transparent toner and the total amount of toner of the four colors does not exceed an upper limit.

If it is presumed that the upper limit is 240%, a difference between the total amount of toner in Equation (1) and the upper limit is the density ratio permitted for the transparent toner layer. Accordingly, an allowable amount for the transparent toner layer is given by the following equation.

[Formula 2]

$$\text{Allowable amount}=240-167=73\% \quad (2)$$

In other words, if the total amount of toner of the four colors is given by Equation (1), the transparent toner layer having a density ratio of 100% cannot be formed on the same pixel and, therefore, the density ratio must be set to a value that does not exceed 73% in order to form an image of the transparent toner.

According to the first exemplary embodiment of the present invention, the print area ratio of the transparent toner layer is controlled so that the density ratio of the transparent toner layer does not exceed the allowable amount.

A transparent-toner print-area-ratio calculator 108 converts the allowable amount into the print area ratio of the transparent toner. The transparent-toner print-area-ratio calculator 108 will be described in detail below.

A mask pattern generator 109 generates a mask pattern used for mask processing of a transparent toner signal on the basis of the print area ratio calculated by the transparent-toner print-area-ratio calculator 108.

The image signal generated by the transparent-toner image generator 106 is supplied to a mask processor 111 through a line delay unit 110. The mask processor 111 performs the mask processing by using the mask pattern generated by the mask pattern generator 109. The mask processing will be described in detail below.

The transparent toner signal generated by the mask processor 111 is supplied to an image forming unit 112 along with the image signal of the four colors (C, M, Y, and K) generated by the halftone processor 104. The image forming unit 112 mixes the full-color image of C, M, Y, and K with the transparent toner image and prints the mixed image on a sheet of paper to provide a final output image.

Entire Process Flow

FIG. 11 is a flowchart showing the entire process in the controller unit 1002. In Step S1101, the transparent-toner pattern specifier 105 in the operational unit 1004 specifies a transparent toner pattern.

In Step S1102, image data is input in the image data input device 101. Image data scanned by the scanner unit 1001 or image data stored in the memory 1005 may be input in the image data input device 101.

In Step S1103, the total amount of toner of the four colors C, M, Y, and K is calculated to determine a print area ratio of the transparent toner.

In Step S1104, mask processing is performed by using the mask pattern in accordance with the determined print area ratio of the transparent toner and the specified transparent toner pattern.

In Step S1105, the transparent toner image subjected to the mask processing is printed.

The order of Step S1101 and Step S1102 may be reversed. That is, image data may first be input in Step S1102 and, then, a transparent toner pattern may be specified in Step S1101.

Setup of Transparent Toner Pattern

Figure 3:
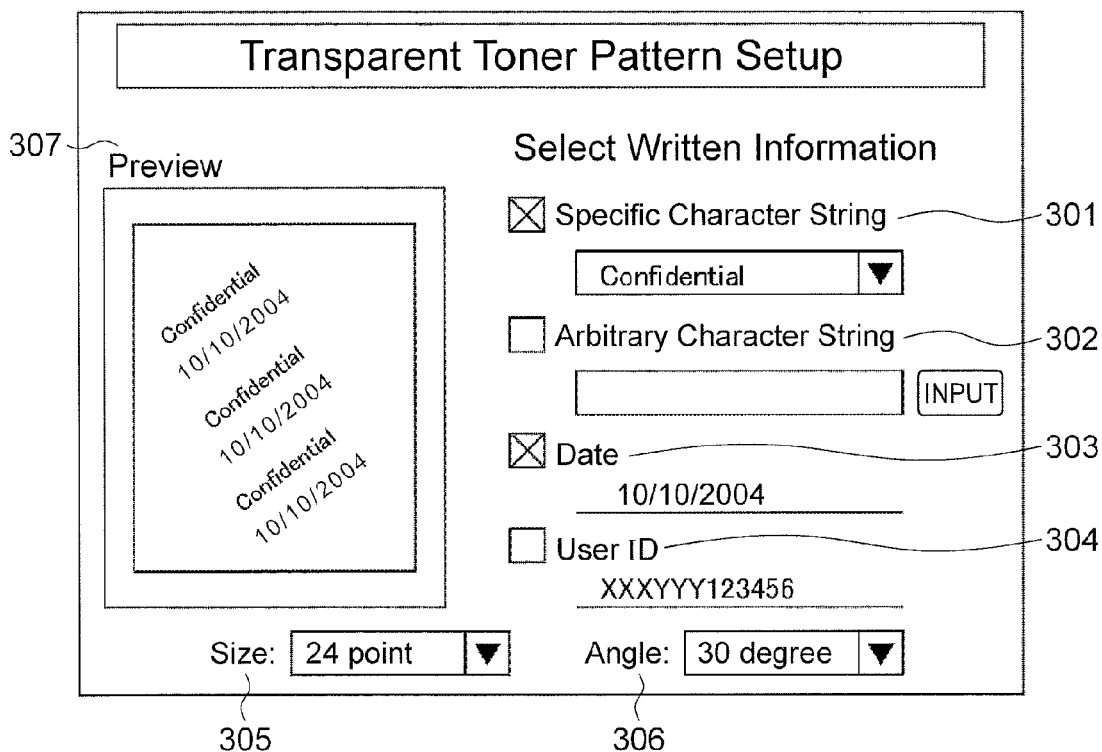
FIG. 3 shows an exemplary screen display of a user interface according to the exemplary embodiments of the present invention.

FIG. 3 shows an example of the screen display of a user interface displayed in the transparent-toner pattern specifier 105. This screen is displayed in the operational unit 1004 in the image forming apparatus 1000 or on a remote operational screen of the display of an information processing apparatus, such as the PC 1008, connected to the image forming apparatus 1000 over a network or the like.

Referring to FIG. 3, reference numeral 301 denotes information concerning a specific character string, which is selected from "Confidential", "Secret", "Copy Prohibited", and so on in a pulldown menu. Reference numeral 302 denotes information concerning an arbitrary character string. Pressing an "INPUT" button at the right side displays a soft keyboard with which an arbitrary character string can be input. The input character string is displayed in the text box. Reference numeral 303 denotes information concerning the operation date, which is automatically displayed by a clock built in the apparatus. Reference numeral 304 denotes ID information of a user who uses the apparatus. The input ID code is automatically displayed when the user logs into the apparatus.

Reference numerals 305 and 306 specify an output format. In the example in FIG. 3, the size and angle of the character string to be printed can be specified by using pulldown menus. The items 301 to 306 can be set, and check boxes for the items 301 to 304 can be used to specify whether the corresponding information is printed. Referring to FIG. 3, the check boxes for the items 301 and 303 are checked.

Reference numeral 307 denotes a preview screen for an output result that is printed on a sheet of paper in accordance with the items 301 to 306. The preview screen can be watched to confirm the output result in advance.

Figure 4:
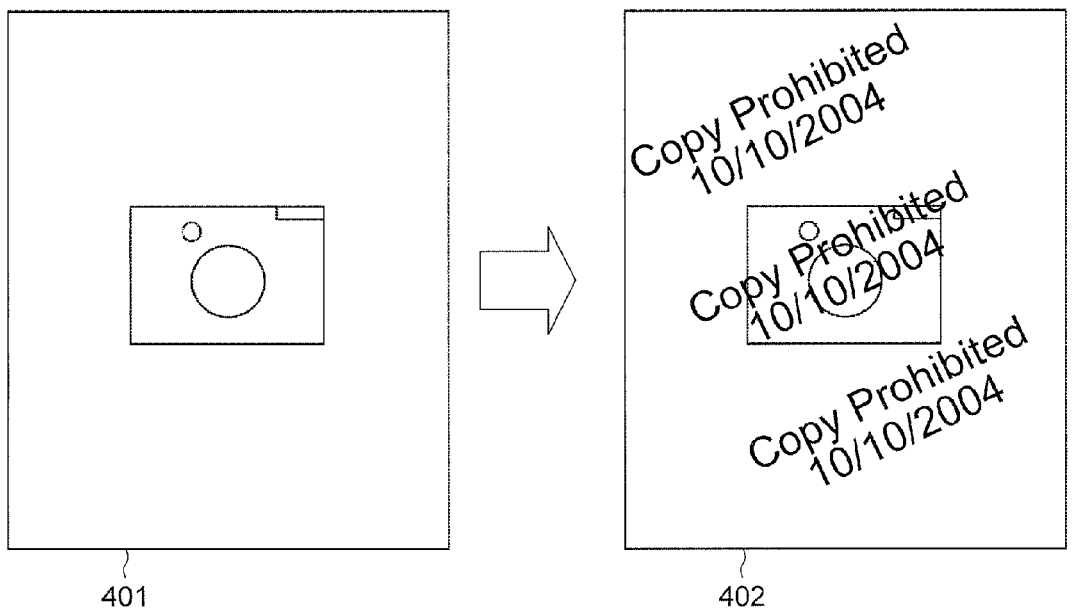
FIG. 4 shows an example of an output image to which a transparent toner pattern is added, according to the exemplary embodiments of the present invention.

FIG. 4 shows an example of an image to which a transparent toner pattern specified by the transparent-toner pattern specifier 105 is added. Reference numeral 401 denotes the original image and reference numeral 402 denotes an image output on a sheet of paper, which image results from the scanning of the original image 401 by the scanner unit 1001, the image processing for the scanned image data in the controller unit 1002, and the addition of the transparent toner layer. In the example in FIG. 4, the specific character string 301 is set to "Copy Prohibited" and the operation date 303 is set to "Oct. 10, 2004" in the user interface of the transparent-toner pattern specifier 105, shown in FIG. 3.

Since the specified character string superimposed on the image 402 is actually drawn with the transparent toner, it is not easy to recognize the character string as an image. However, holding the output image to the light and observing the image at an angle allows the user to recognize the character string printed with the transparent toner, because of the glossiness of the transparent toner.

Control of Print Ratio of Transparent Toner

A method of controlling the amount of the transparent toner, performed in the total-amount-of-toner calculator 107, the transparent-toner print-area-ratio calculator 108, the mask pattern generator 109, the line delay unit 110, and the mask processor 111, described above, will now be described.

Figure 5:
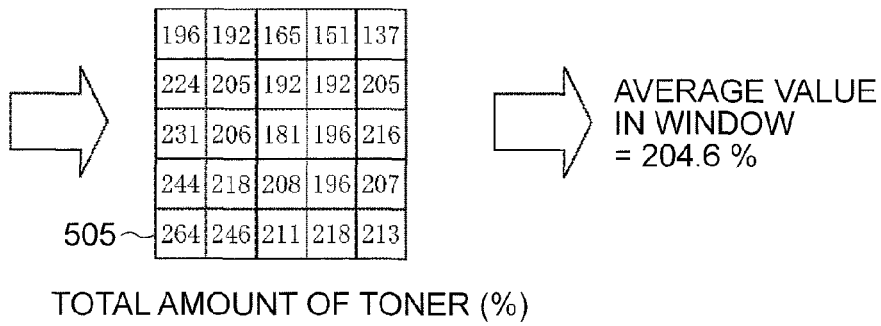
FIG. 5 illustrates calculation of the total amount of toner, according to the exemplary embodiments of the present invention.

The total-amount-of-toner calculator 107 will be described in detail with reference to FIG. 5. FIG. 5 illustrates the distribution of the values of the pixels in the C, M, Y, and K signal components in windows each including 5×5 pixels and a process of calculating the total amount of toner of each pixel in the window. The window means a predetermined area including multiple pixels. Windows 501 to 504 include eight-bit integers (0 to 255) representing exemplary values of the image signals C, M, Y, and K, when the areas each including 5×5 pixels are cut out from the image. The total-amount-of-toner calculator 107 generates a total-amount-of-toner signal for every corresponding pixel according to Equation (1). A window 505 includes the total-amount-of-toner signals yielded from the areas 501 to 504 each including 5×5 pixels according to Equation (1). The numerals in the window 505 are represented by percentages because Equation (1) is used.

The total-amount-of-toner signal for every pixel in the windows, output from the total-amount-of-toner calculator 107, is supplied to the transparent-toner print-area-ratio calculator 108. The transparent-toner print-area-ratio calculator 108 adds the values in the window 505 and calculates an average of the values to yield an average of the total amount of toner. The average of the total amount of toner becomes 204.6% in the example in FIG. 5. The transparent-toner print-area-ratio calculator 108 then calculates a difference between the average of the total amount of toner and a predetermined upper limit by calculation similar to Equation (2). With the upper limit being set to 240% as in the above example, the allowable ratio for the transparent toner layer is given by the following equation.

[Formula 3]

$$\text{Allowable amount for transparent toner} = 240 - 204.6 = 35.4\% \quad (3)$$

The transparent-toner print-area-ratio calculator 108 truncates the numerals after the decimal point of the allowable amount for the transparent toner, calculated according to Equation (3), and supplies the allowable amount of the transparent toner to the mask pattern generator 109 as an integer.

This integer represents a ratio indicating how much transparent toner can be added to the toner of four colors C, M, Y, and K for every window including 5×5 pixels. If the allowable amount exceeds 100%, the transparent toner can be recorded in the window at the maximum density. In contrast, if the allowable amount is less than or equal to 100% as in the result of Equation (3), a normal output image cannot be generated unless the density of the transparent toner is reduced.

According to the first exemplary embodiment of the present invention, controlling the area printed with the transparent toner in the target window in accordance with the ratio in Equation (3) allows a normal image to be output. For this control, the mask pattern generator 109 generates a mask pattern used for turning on/off the printing with the transparent toner for every pixel. The mask pattern will be described in detail with reference to FIG. 6.

Figure 6:
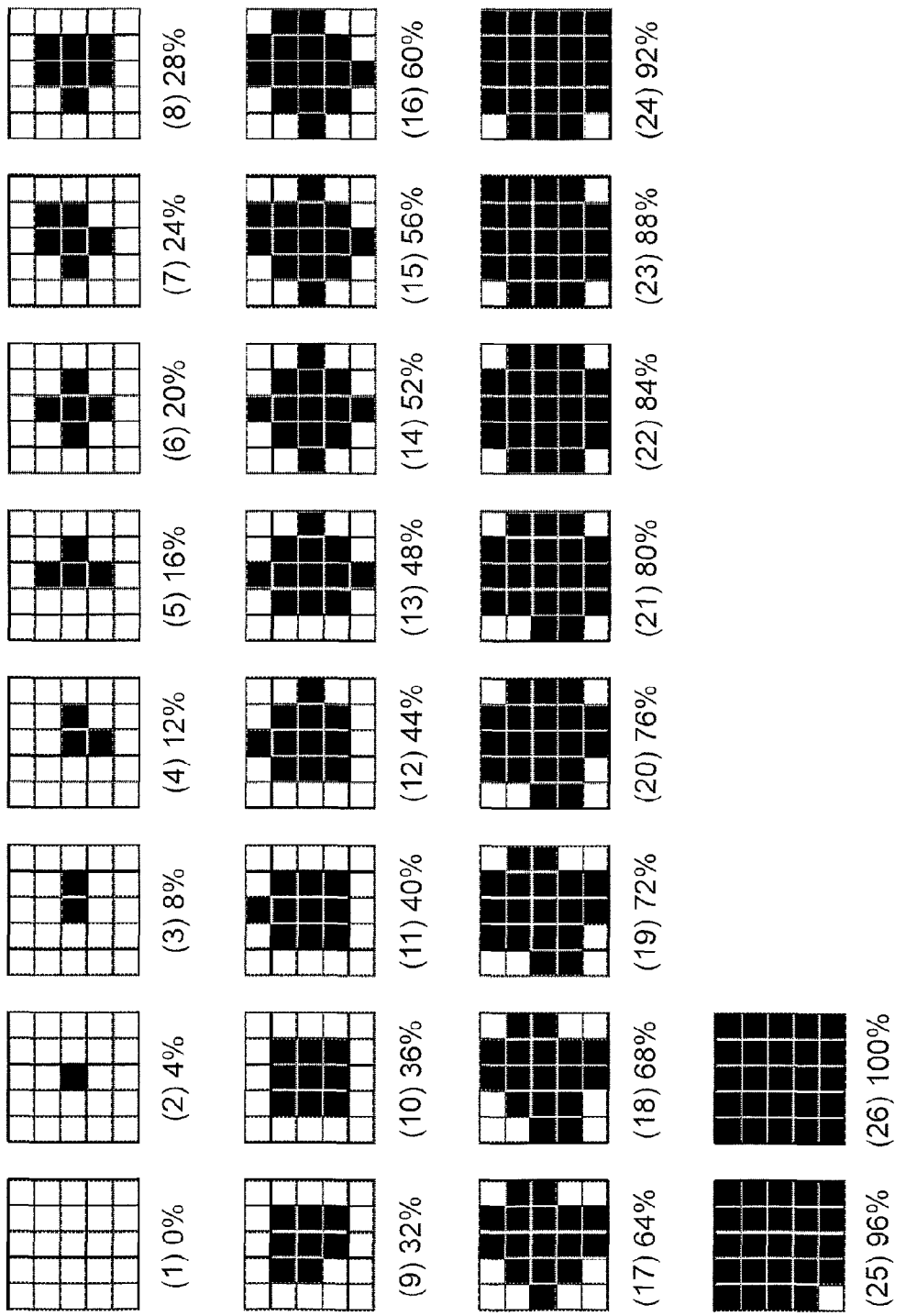
FIG. 6 shows exemplary mask patterns according to the exemplary embodiments of the present invention.

FIG. 6 shows 26 mask patterns from (1) to (26). Each square represents a pixel and 5×5 pixels form one window. A black square represents a pixel in which the transparent toner is turned on (printed) while a white square represents a pixel in which the transparent toner is turned off (not printed). The windows (1) to (26) in FIG. 6 have different number of pixels to be turned on, and the percentages at the right side of the numbers represent the ratios of the pixels to be turned on to the entire 5×5 pixels (total of 25 pixels). If the ratio of pixels in which the transparent toner is turned on is 0%, the mask pattern shown in (1) in FIG. 6 is selected. If the ratio is 4%, the mask pattern shown in (2) in FIG. 6 is selected and one central pixel is turned on. As the ratio becomes higher, an increasing number of pixels adjacent to the central pixel of the mask pattern are turned on. If the ratio is 100%, the mask pattern shown in (26) in FIG. 6 is selected and all the pixels in the mask pattern are turned on. Of the mask patterns in FIG. 6, the area in which the transparent toner is turned on is expanded as the ratio becomes higher. The area is not discretely expanded but is continuously expanded around a certain pixel. Such mask patterns expanding continuously, such as the ones shown in FIG. 6, are referred to as pixel-cluster-type mask patterns. Specifically, when the allowable amount calculated by the transparent-toner print-area-ratio calculator 108 is considered as an area ratio, setting the area ratio in FIG. 6 to a value lower than the allowable amount allows the sum of the amount of the transparent toner and the amount of toner of the four colors C, M, Y, and K in the window to be set so as not to exceed the upper limit of the amount of toner. In other words, it is possible to correctly control the amount of toner per unit area in consideration of the toner of the four colors C, M, Y, and K and the transparent toner.

The transparent toner becomes easily visible and has an enhanced transparency by intensively applying the transparent toner to the multiple pixels, such as the ones shown in FIG. 6, compared with the case where the transparent toner is discretely applied to the pixels. Accordingly, according to the first exemplary embodiment of the present invention, the transparent toner layer is controlled per unit area, instead of being discretely controlled for every pixel, to intensively apply the transparent toner to the multiple pixels, as shown in FIG. 6. As described above, controlling the transparent toner for every pixel discretely applies the transparent toner and, thus, it is unlikely to achieve an enhanced transparency.

Since the allowable amount for the transparent toner is 35.4% in Equation (3), the mask pattern shown in (9) in FIG. 6 is selected as the mask pattern having a print area ratio of not more than 35.4%. Similarly, the mask pattern shown in (26) in FIG. 6 is selected if the allowable amount is 100% or more, and the mask pattern shown in (1) in FIG. 6 is selected if the allowable amount is 0% or less. Applying the mask pattern shown in (1) in FIG. 6 when the area having an allowable amount of 0% or less occupies a larger percentage of the image completely misses the information added by the transparent toner. In such a case, the position of the pixel to be printed is made variable if the allowable amount is 0% or less whereas one pixel is printed in the area including 5×5 pixels if the allowable amount is 4% or less. Specifically, a pixel having a minimum amount of toner of the four colors C, M, Y, and K in the window including the 5×5 pixels is selected and the print position is set to the selected pixel. The above process of changing the position where the transparent toner is printed, for the area having an allowable amount of 0% or less, may be always effective or may become automatically effective if areas of a number that is greater than a predetermined threshold, having an allowable amount of 0%, continuously appear. The mask pattern selected in the above manner is supplied from the mask pattern generator 109 to the mask processor 111. The transparent toner image signal generated by the transparent-toner image generator 106 is delayed by a time corresponding to five lines in the line delay unit 110 in order to wait for completion of the processing of the window including 5×5 pixels in the total-amount-of-toner calculator 107, the transparent-toner print-area-ratio calculator 108, and the mask pattern generator 109. The transparent toner image signal delayed in the line delay unit 110 is mixed with the mask pattern supplied from the mask pattern generator 109 in the mask processor 111 for every window and the mixed image signal is finally supplied to the image forming unit 112.

Specifically, the transparent toner image signal generated by the transparent-toner image generator 106 is output as a digital signal having a value "1" for the pixel in which the transparent toner is printed and is output as a digital signal having a value "0" for the pixel in which the transparent toner is not printed. The mask pattern supplied from the mask pattern generator 109 is output as a digital signal having the value "1" for the pixel that is turned on and is output as a digital signal having the value "0" for the pixel that is turned off. Performing AND operation for every pixel in the mask processor 111 can generate a transparent-toner-image print signal having a value "0" or "1", to be finally supplied to the image forming unit 112.

The image forming unit 112 performs image formation in accordance with the digital signal having a value "0" or "1", supplied from the mask processor 111, so that the transparent toner is printed out at a maximum density (a maximum amount of toner) for every pixel.

As described above, according to the first exemplary embodiment of the present invention, it is possible to store the amount of toner of the four colors C, M, Y, and K and to control the amount of toner per unit area when the toner of the four colors C, M, Y, and K and the transparent toner are used.

Second Exemplary Embodiment

A second exemplary embodiment of the present invention will be described. The same reference numerals are used in the second exemplary embodiment to identify appropriately the same components shown in the first exemplary embodiment. A detailed description of such components is omitted herein.

The transparent toner is superimposed on the document that is scanned by the scanner and is copied in the first exemplary embodiment. In contrast, according to the second exemplary embodiment, the transparent toner is superimposed on an electronic document that is printed from an information processing apparatus, such as a PC, via a printer driver.

A bitmap image supplied from a raster image processor (RIP), which expands electronic information described in a page description language etc. into a raster image, is input into the image data input device 101 in FIG. 1.

The transparent toner pattern may be input and set on an operation screen of the printer driver in the computer. Specifically, the transparent toner pattern may be set in the printer driver of the PC 1008 connected to the image forming apparatus 1000 via a network, such as a LAN. In such a case, the user interface shown in FIG. 3 is displayed as a setup screen of the printer driver and necessary settings are specified in the PC 1008.

As described above, according to the second exemplary embodiment of the present invention, it is possible to store the amount of toner of the four colors C, M, Y, and K and to correctly control the amount of the transparent toner even when the electronic document is printed from the PC via the printer driver.

Third Exemplary Embodiment

A third exemplary embodiment of the present invention will be described. The same reference numerals are used in the third exemplary embodiment to identify appropriately the same components shown in the first exemplary embodiment. A detailed description of such components is omitted herein.

The total amount of toner is calculated before the halftone processing in the first and second exemplary embodiments. In contrast, according to the third exemplary embodiment, the total amount of toner is calculated after the halftone processing.

Figure 7:
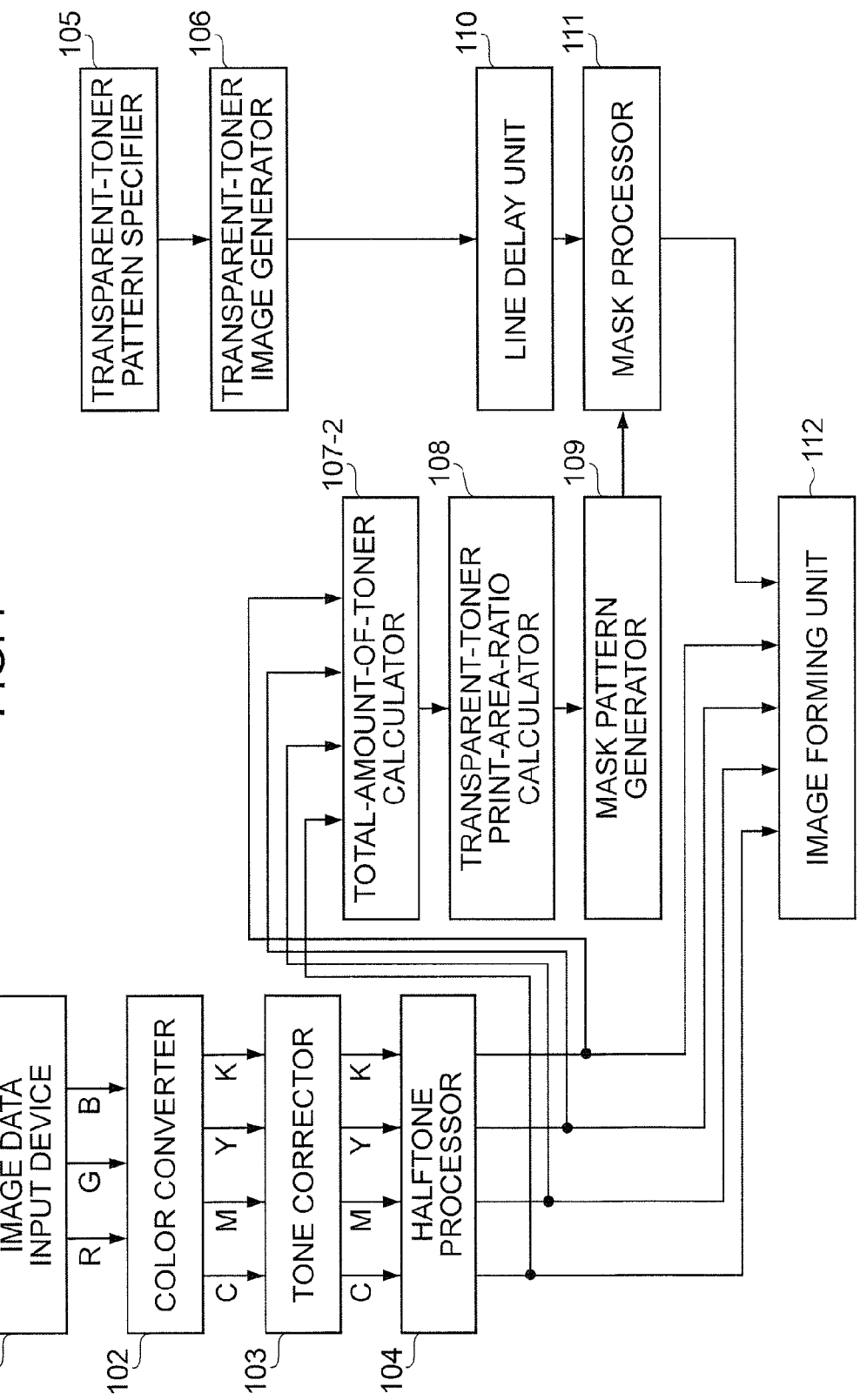
FIG. 7 is a block diagram illustrating image processing according to a third exemplary embodiment.

FIG. 7 is a block diagram showing in detail an example of the structure of a controller unit 1002 according to the third exemplary embodiment. The controller unit 1002 in the third exemplary embodiment differs from the controller unit 1002 in the first exemplary embodiment only in a total-amount-of-toner calculator 107-2. Other components in the controller unit 1002 in the third exemplary embodiment are the same as the controller unit 1002 in the first exemplary embodiment.

The calculation of the total amount of toner in the total-amount-of-toner calculator 107-2 is performed by using signal values after the halftone processing. After the halftone processing is performed in the halftone processor 104, the binary signal having a value "0" or "1" is output. Accordingly, the total amount of toner of the four colors C, M, Y, and K is calculated by adding the amounts of the toner of the pixels having the value "1", among the pixels that are turned on (having the value "1") and the pixels that are turned off (having the value "0").

For example, if all the four colors C, M, Y, and K are turned on, the ratio of the amount of toner is calculated by 4/4=100%. If the two colors of the four colors C, M, Y, and K are turned on, the ratio of the amount of toner is calculated by 2/4=50%. After the ratio of the amount of toner per pixel (any of 0%, 25%, 50%, 75%, or 100%) is calculated, adding the values of the pixels in a predetermined window to calculate an average value can yield a desired area ratio. This method is similar to that in the first exemplary embodiment and the subsequent processing is performed in the same manner as in the first exemplary embodiment.

As described above, according to the third exemplary embodiment of the present invention, it is possible to calculate the total amount of toner of the four colors C, M, Y, and K for the pixels after the halftone processing, to store the amount of the toner of the four colors C, M, Y, and K, and to control the amount of toner per unit area.

Fourth Exemplary Embodiment

A fourth exemplary embodiment of the present invention will be described. The same reference numerals are used in the fourth exemplary embodiment to identify appropriately the same components shown in the first exemplary embodiment. A detailed description of such components is omitted herein.

The mask pattern including 5×5 pixels, shown in FIG. 6, is used as one unit in the first to third exemplary embodiments. In contrast, according to the fourth exemplary embodiment, a mask pattern including 10×10 pixels, such as the one shown in FIG. 8, is used as one unit.

Defining the mask pattern that includes 10×10 pixels as one unit and that grows from the central pixel halves a spatial frequency (doubles the period) at which the transparent toner layer is printed after mask processing.

Figures 8, 9:
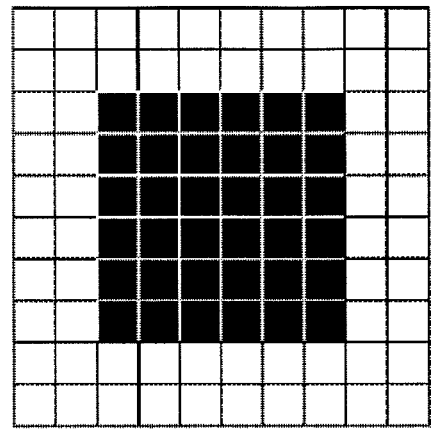
FIG. 8 shows another exemplary mask pattern according to a fourth exemplary embodiment of the present invention.
FIG. 9 shows an exemplary user interface according to a sixth exemplary embodiment of the present invention.

For example, in order to convert the mask pattern having an area ratio of 36% shown in (10) in FIG. 6 into a mask pattern including the 10×10 pixels, the mask pattern including 10×10 pixels, shown in FIG. 8, is used.

Decreasing the spatial frequency corresponds to a reduction in spatial density of the transparent toner layer and results in a reduction in load on the fixing unit. Hence, a decrease in the spatial frequency allows the upper limit of the total amount of toner including the transparent toner to be slightly increased. Specifically, although the upper limit of the amount of toner is 240% when the mask patterns shown in FIG. 6 are used, the upper limit of the amount of toner can be increased to 280% when the mask pattern including 10×10 pixels, shown in FIG. 8, is used. Accordingly, it is possible to use a structure in which the upper limit is controlled in accordance with the spatial frequency of the mask pattern.

In addition, varying the mask frequency of the transparent toner layer can also control the glossiness. Hence, the frequency of the mask pattern may be set to a higher frequency in order to increase the glossiness, whereas the frequency of the mask pattern may be set to a lower frequency in order to decrease the glossiness.

The unit of the mask pattern is not limited to 5×5 pixels and 10×10 pixels, and may be set to a larger area including 16×16 pixels or 32×32 pixels. Since a larger area decreases the spatial frequency at which the transparent toner is printed (lengthen the period), a load on the electrophotographic process is reduced.

As described above in the first exemplary embodiment, modification of the mask pattern is possibly required in an area having an extremely small allowable amount. If it is possible to predict such a problem, the mask pattern having a lower spatial frequency, such as the one including 10×10 pixels according to the fourth exemplary embodiment, may be applied.

Fifth Exemplary Embodiment

A fifth exemplary embodiment of the present invention will be described. The same reference numerals are used in the fifth exemplary embodiment to identify appropriately the same components shown in the first exemplary embodiment. A detailed description of such components is omitted herein.

The transparent toner is used for printing, in addition to the toner of the four colors C, M, Y, and K, in the first to fourth exemplary embodiments. In contrast, according to the fifth exemplary embodiment, the toner of a special color is used for printing, instead of the transparent toner.

For example, fluorescent toner or orange toner is used for printing as the toner of a special color, in addition to the toner of the normal four colors C, M, Y, and K. If the total amount of toner exceeds the upper limit, spatial mask processing is performed in order to decrease the area ratio of the toner of a certain color. For example, when the orange toner is used as the toner of the special color, the area ratio based on the amount of the toner of two colors Y and M is calculated and the mask processing is performed for the orange toner on the basis of the calculated area ratio.

This is based on a prediction that, if the toner of magenta and yellow relating to the hue of colors similar to orange has a higher area ratio, decreasing the area ratio of the orange toner, which is relatively invisible, does not have a great influence on the hue.

As described above, according to the fifth exemplary embodiment of the present invention, it is possible to use the orange toner or the fluorescent toner, instead of the transparent toner, as the special toner to be printed on a sheet of paper. In this case, it is possible for a user to recognize an added character string without using means for holding the output image to the light and observing the image at an angle.

Sixth Exemplary Embodiment

A sixth exemplary embodiment of the present invention will be described. The same reference numerals are used in the sixth exemplary embodiment to identify appropriately the same components shown in the first exemplary embodiment. A detailed description of such components is omitted herein.

The amount of toner per unit area is controlled to simultaneously print the toner of the four colors C, M, Y, and K and the transparent toner on a sheet of paper and to cause the sheet of paper to pass through the fixing unit in the first to fifth exemplary embodiments. In contrast, according to the sixth exemplary embodiment, after the toner of the four colors C, M, Y, and K is printed on a sheet of paper and is fixed, the sheet of paper is returned back to the first stage of the paper path and the sheet of paper is ejected after the transparent toner is printed on the same sheet of paper and the sheet of paper passes through the fixing unit once again.

With this structure, it is possible to surely form the transparent toner layer independently of the amount of the toner of the four colors C, M, Y, and K, although the performance is degraded because of the longer time during which the image forming process is performed.

FIG. 9 illustrates an operation screen used for selecting a mode of the mask processing for the transparent toner. The operation screen in FIG. 9 is displayed in the operational unit 1004 or in the display of the PC 1008 in the image forming apparatus 1000 in Step S1101 in FIG. 11. In this operation screen, check boxes can be used to specify whether priority is given to the effect of the transparent toner or whether priority is given to the print speed.

If the mode in which priority is given to the effect of the transparent toner is selected, the processing according to the sixth exemplary embodiment is performed. That is, after the toner of the four colors C, M, Y, and K is printed on a sheet of paper and the fixing is performed, the transparent toner is printed on the same sheet of paper and the fixing is performed for the transparent toner layer. In contrast, if the mode in which priority is given to the print speed is selected, the processing according to the first exemplary embodiment is performed. That is, the toner of the four colors C, M, Y, and K and the transparent toner are simultaneously printed on a sheet of paper while controlling the amount of toner per unit area and, then, the fixing is performed.

The processing according to the sixth exemplary embodiment is selected in a case where priority is given to the effect of the transparent toner and it is desired that the transparent toner layer be well formed.

As described above, according to the sixth exemplary embodiment of the present invention, if priority is given to the effect of the transparent toner, it is possible to form the transparent toner layer independently of the print area ratio of the toner of the four colors C, M, Y, and K, although the performance is degraded because of the longer time during which the image forming process is performed. If priority is given to the print speed, it is possible to increase the print speed, compared with the case where priority is given to the effect, although the mask processing is performed for the transparent toner layer. Consequently, each mode can be selected according to the user's application.

Other Embodiments

The present invention is applicable to a system including multiple apparatuses (for example, a host computer, an interface device, a scanner, and a printer) or to an apparatus (for example, a copier or a facsimile machine) including one device.

The present invention can be embodied by supplying a storage medium (or a recording medium) having the program code (software) realizing the functions according to the above exemplary embodiments to a system or an apparatus, the computer (or the central processing unit (CPU) or the micro processing unit (MPU)) in which system or apparatus reads out and executes the program code stored in the storage medium. In this case, the program code itself read out from the storage medium realizes the functions of the embodiments described above. The present invention is applicable to the storage medium having the program code stored therein. The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the storage medium has been written in a memory that is provided in an expansion card included in the computer or in an expansion unit connected to the computer, the CPU or the like in the expansion board or the expansion unit may execute all or part of the actual processing based on instructions in the program code to realize the functions of the embodiments described above.

When the present invention is applied to the storage medium, the program code corresponding to the flowchart described above is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-192202 filed Jun. 30, 2005, which is hereby incorporated by reference herein in its entirety.

The invention claimed is:

1. An image processing apparatus comprising:
 a calculation unit configured to calculate an amount of a first coloring material in an area including a plurality of pixels;
 a determination unit configured to determine an allowable amount of a second coloring material in the area on the basis of the amount of the first coloring material, calculated by the calculation unit, and a limit of the amount of the coloring material in the area; and
 a control unit configured to control an amount of the second coloring material in the area so as not to exceed the allowable amount of the second coloring material,
 wherein the determination unit determines a mask pattern in the area corresponding to the allowable amount of the second coloring material in the area,
 wherein the control unit controls an amount of the second coloring material for a pixel in the area on the basis of the mask pattern, and
 wherein the mask pattern is a pixel-cluster-type mask pattern.

2. The image processing apparatus according to claim 1, wherein the first coloring material is at least one of cyan, magenta, yellow, and black, and
 wherein the second coloring material is a substantially colorless and transparent coloring material having no specific hue.

3. The image processing apparatus according to claim 1, wherein the first coloring material is at least one of cyan, magenta, yellow, and black, and
 wherein the second coloring material has a saturation higher than a saturation of a color resulting from mixing of two or more colors in the first coloring material.

4. An image processing method comprising the steps of:
 calculating an amount of a first coloring material in an area including a plurality of pixels;
 determining an allowable amount of a second coloring material in the area on the basis of the calculated amount of the first coloring material and a limit of the total amount of all the coloring material in the area; and
 controlling an amount of the second coloring material in the area so as not to exceed the allowable amount of the second coloring material,
 wherein a mask pattern in the area corresponding to the allowable amount of the second coloring material in the area is determined in the determining step,
 wherein an amount of the second coloring material is controlled for a pixel in the area on the basis of the mask pattern in the controlling step, and wherein the limit of the amount of the coloring material is determined in accordance with a spatial frequency of the mask pattern.

5. A non-transitory computer-readable storage medium having a program stored thereon, the program including program code comprising the steps of:
calculating an amount of a first coloring material in an area including a plurality of pixels;
determining an allowable amount of a second coloring material in the area on the basis of the calculated amount of the first coloring material and a limit of the amount of the coloring material in the area; and
controlling an amount of the second coloring material in the area so as not to exceed the allowable amount of the second coloring material,
wherein a mask pattern in the area corresponding to the allowable amount of the second coloring material in the area is determined in the determining step,
wherein an amount of the second coloring material is controlled for a pixel in the area on the basis of the mask pattern in the controlling step, and
wherein the mask pattern is a pixel-cluster-type mask pattern.

6. An image processing apparatus comprising:
a calculation unit configured to calculate an amount of a first coloring material in an area including a plurality of pixels;
a determination unit configured to determine an allowable amount of a second coloring material in the area on the basis of the amount of the first coloring material, calculated by the calculation unit, and a limit of the amount of the coloring material in the area;
a control unit configured to control an amount of the second coloring material in the area so as not to exceed the allowable amount of the second coloring material; and
a specification unit configured to specify an image to be generated with the second coloring material,
wherein the determination unit determines a mask pattern in the area corresponding to the allowable amount of the second coloring material in the area,
wherein the control unit controls an amount of the second coloring material for a pixel in the area on the basis of the mask pattern, and
wherein the image generated with the second coloring material, specified by the specification unit, includes at least one of a specific character string, an arbitrary character string, a date when the image data is generated, and a user ID.

7. The image processing apparatus according to claim 6, wherein the specification unit indicates disablement of the control unit.

8. An image processing apparatus comprising:
a calculation unit configured to calculate an amount of a first coloring material in an area including a plurality of pixels;
a determination unit configured to determine an allowable amount of a second coloring material in the area on the basis of the amount of the first coloring material, calculated by the calculation unit, and a limit of the amount of the coloring material in the area; and
a control unit configured to control an amount of the second coloring material in the area so as not to exceed the allowable amount of the second coloring material,
wherein the determination unit determines a mask pattern in the area corresponding to the allowable amount of the second coloring material in the area,
wherein the control unit controls an amount of the second coloring material for a pixel in the area on the basis of the mask pattern, and
wherein the limit of the amount of the coloring material is determined in accordance with a spatial frequency of the mask pattern.

9. An image processing method comprising the steps of:
calculating an amount of a first coloring material in an area including a plurality of pixels;
determining an allowable amount of a second coloring material in the area on the basis of the calculated amount of the first coloring material and a limit of the total amount of all the coloring material in the area; and
controlling an amount of the second coloring material in the area so as not to exceed the allowable amount of the second coloring material,
wherein a mask pattern in the area corresponding to the allowable amount of the second coloring material in the area is determined in the determining step,
wherein an amount of the second coloring material is controlled for a pixel in the area on the basis of the mask pattern in the controlling step, and
wherein the mask pattern is a pixel-cluster-type mask pattern.

10. The image processing method according to claim 9, wherein the first coloring material is at least one of cyan, magenta, yellow, and black, and
wherein the second coloring material is a substantially colorless and transparent coloring material having no specific hue.

11. An image processing apparatus comprising:
a calculation unit configured to calculate an amount of a first coloring material in an area including a plurality of pixels;
a determination unit configured to determine an allowable amount of a second coloring material in the area on the basis of the amount of the first coloring material, calculated by the calculation unit, and a limit of the amount of the coloring material in the area; and
a control unit configured to control an amount of the second coloring material in the area so as not to exceed the allowable amount of the second coloring material,
wherein the determination unit determines a mask pattern in the area corresponding to the allowable amount of the second coloring material in the area,
wherein the control unit controls an amount of the second coloring material for a pixel in the area on the basis of the mask pattern, and
wherein the limit of the amount of the coloring material is determined in accordance with the size of one unit of the mask pattern.

12. The image processing apparatus according to claim 11, wherein the limit of the amount of the coloring material is determined such that the limit increases as the size of one unit of the mask pattern becomes larger.

* * * * *